(12) United States Patent
Nieuwenhuizen

(10) Patent No.: US 9,670,906 B2
(45) Date of Patent: Jun. 6, 2017

(54) BEARING ARRANGEMENT FOR A WIND TURBINE

(75) Inventor: John Nieuwenhuizen, Horsens (DK)

(73) Assignee: SIEMENS AKTIENGESELLSCHAFT (DE)

( * ) Notice: Subject to any disclaimer, the term of this patent is extended or adjusted under 35 U.S.C. 154(b) by 463 days.

(21) Appl. No.: 14/354,179

(22) PCT Filed: Apr. 12, 2012

(86) PCT No.: PCT/EP2012/056669
§ 371 (c)(1),
(2), (4) Date: May 30, 2014

(87) PCT Pub. No.: WO2013/110350
PCT Pub. Date: Aug. 1, 2013

(65) Prior Publication Data
US 2014/0341741 A1   Nov. 20, 2014

(30) Foreign Application Priority Data
Jan. 27, 2012   (EP) ...................................... 12152812

(51) Int. Cl.
*F03D 11/00* (2006.01)
*F16C 17/24* (2006.01)
(Continued)

(52) U.S. Cl.
CPC .......... *F03D 11/0008* (2013.01); *F03D 80/00* (2016.05); *F03D 80/30* (2016.05);
(Continued)

(58) Field of Classification Search
CPC ................................................ F03D 11/00008
(Continued)

(56) References Cited

U.S. PATENT DOCUMENTS 4,625,256 A * 11/1986 Scuka ....................... H01T 7/00
361/117
4,814,699 A * 3/1989 Koziel ................ G01R 31/343
324/511
(Continued)

FOREIGN PATENT DOCUMENTS

CN      1854545 A    11/2006
CN    101228362 A     7/2008
(Continued)

OTHER PUBLICATIONS

PCT/EP2012/056669 International Search Report and Written Opinion. Date of Mailing: Oct. 24, 2012. Siemens Aktiengesellschaft (11 pages).
(Continued)

*Primary Examiner* — Stephen W Jackson
(74) *Attorney, Agent, or Firm* — Schmeiser Olsen & Watts LLP

(57) ABSTRACT

A bearing arrangement to avoid a static charge in a bearing is provided.
A bearing arrangement for a wind turbine comprises a first bearing shell that is prepared to be coupled to a first part of the wind turbine. The bearing arrangement comprises a second bearing shell that is prepared to be coupled to a second part of the wind turbine. The first and the second bearing shell are arranged in a way that the first and the second bearing shell are rotatable with respect to each other and have a first isolation ring for electrical isolation, so that the first part of the wind turbine can be rotated with respect to the second part of the wind turbine and avoid static discharge.

16 Claims, 2 Drawing Sheets

(51) Int. Cl.
*F03D 80/00* (2016.01)
*F03D 80/70* (2016.01)
*F03D 80/30* (2016.01)

(52) U.S. Cl.
CPC .............. *F03D 80/70* (2016.05); *F16C 17/24* (2013.01); *Y02E 10/72* (2013.01)

(58) Field of Classification Search
USPC .......................................................... 361/220
See application file for complete search history.

(56) References Cited

U.S. PATENT DOCUMENTS

| | | | | |
|---|---|---|---|---|
| 4,939,506 | A * | 7/1990 | Gram | H01R 39/64 340/649 |
| 5,485,331 | A * | 1/1996 | Dunfield | G11B 17/02 360/99.08 |
| 5,661,353 | A * | 8/1997 | Erdman | H02K 11/01 310/214 |
| 7,050,272 | B1 | 5/2006 | McKinstry et al. | |
| 7,249,935 | B2 * | 7/2007 | Pedersen | F03D 80/30 416/146 R |
| 8,425,120 | B2 | 4/2013 | Konno et al. | |
| 2011/0149459 | A1 | 6/2011 | Baumann | |
| 2012/0269631 | A1 | 10/2012 | Lewke | |

FOREIGN PATENT DOCUMENTS

| | | |
|---|---|---|
| EP | 0494446 A1 | 7/1992 |
| EP | 1632677 A2 | 3/2006 |
| JP | 2005151749 A | 6/2005 |
| WO | WO 0186144 A1 | 11/2001 |
| WO | WO 2011069686 A1 | 6/2011 |
| WO | 2011131826 A1 | 10/2011 |
| WO | 2011141511 A2 | 11/2011 |

OTHER PUBLICATIONS

Chinese Application No. 201280068092.6 Office Action issued on Mar. 22, 2016. 8 pages.
Schaeffler Gruppe;"FAG—Stromisolierende Lager—Wälzlager zur Vermeidung von Stromdurchgangsschäden"; pp. 1-20;; 2011; (English translation will follow).
Schaeffler Gruppe;"FAG—Stromisolierende Lager—Wälzlager zur Vermeidung von Stromdurchgangsschäden"; pp. 1-20; 2011 (non-english translation submitted Dec. 28, 2016).

* cited by examiner

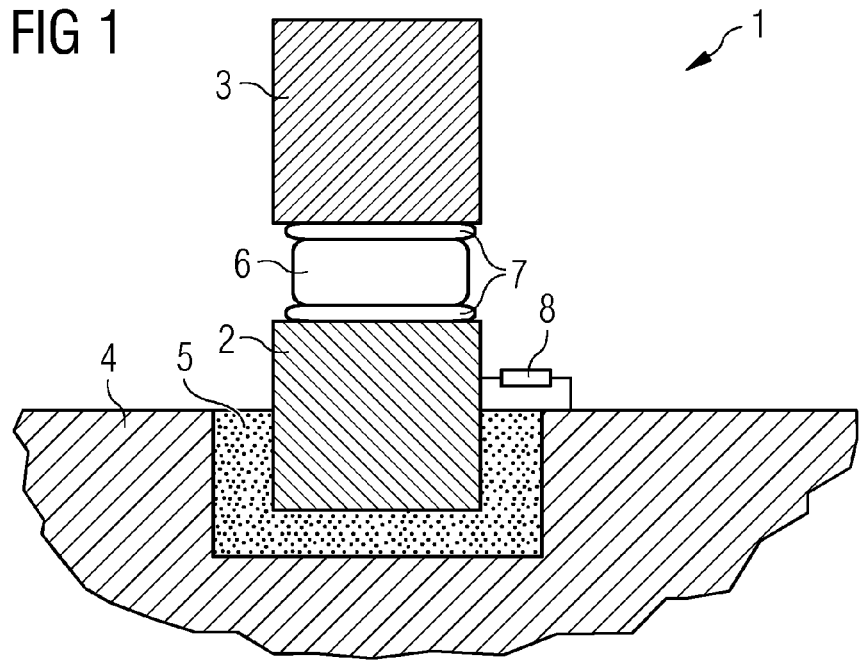
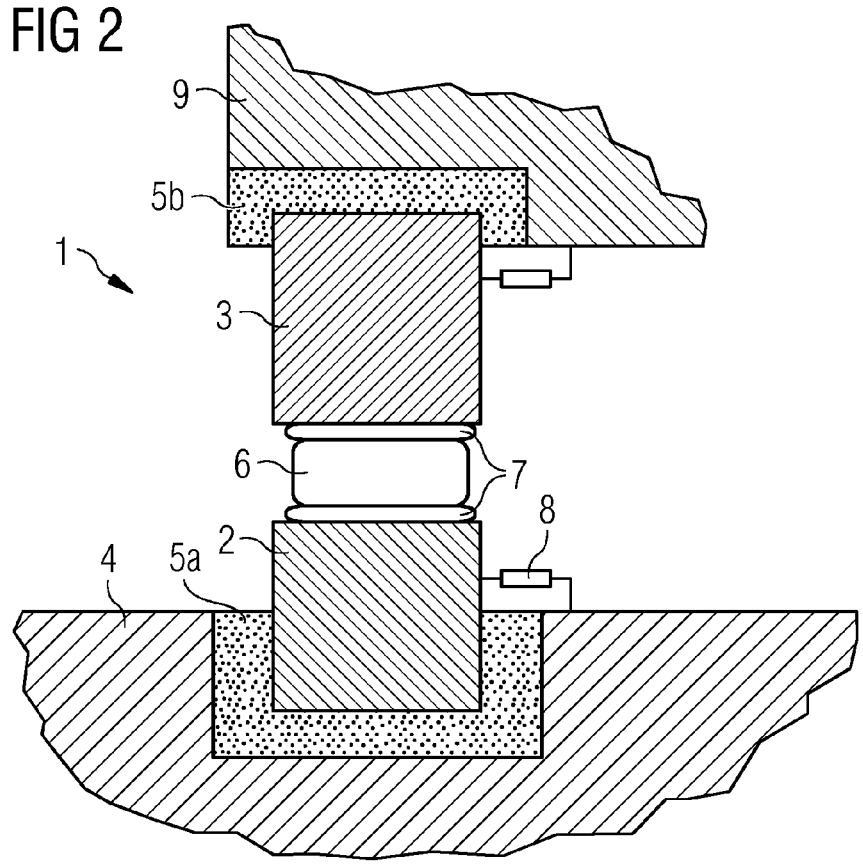

BEARING ARRANGEMENT FOR A WIND TURBINE

CROSS-REFERENCE TO RELATED APPLICATIONS

This application claims priority to PCT Application No. PCT/EP2012/056669, having a filing date of Apr. 12, 2012, based off of EP Application No. 12152812.9, having a filing date of Jan. 27, 2012, the entire contents of which are hereby incorporated by reference.

FIELD OF TECHNOLOGY

The following relates to a bearing arrangement to avoid a static charge in a bearing.

BACKGROUND

A bearing is a common part in machinery like wind turbines. Bearings are used to separate a rotating part of the machinery from a stationary part of the machinery. Bearings allow the rotation of the rotating part in respect to the stationary part while at the same time minimizing the friction between the two parts.

In wind turbines, bearings are used for several functions. In geared wind turbines, several bearings are used within the drive train for the hub, the main shaft, the gearbox and the generator. Bearings are also used in a wind turbine to allow the pitch movement of the rotor blades with respect to the hub.

Especially in direct drive wind turbines there is one main bearing carrying the rotor, including the hub, the rotor blades and a generators rotor of the wind turbine. This main bearing can be a bearing with a rolling element or a sliding bearing.

Such a main bearing is a major component of a direct drive wind turbine making up a considerable portion of total cost of the wind turbine. The exchange of such a main bearing bears extensive effort and cost, including a lifting operation to detach the hub from the bearing and gain access to the bearing.

To avoid the flow of electric currents through the bearing, the bearing is often electrically isolated from the rest of the machinery.

Electric currents can be creep currents, common mode currents, currents due to static charges or discharges in the case of lightning for example.

A conductive path bypassing the bearing is often provided to avoid the flow of electric currents, for instance from lightning, through the bearing.

Electric currents or discharges in the bearing i.e. electric sparks can lead to a degrading of the lubricant in the bearing, to the formation of hydrogen and carbonization of lubricant in the bearing. Also a static charge present in the bearing can lead to damage of the lubricant, especially due to electrolysis.

These can damage the lubrication of the bearing and can lead to a higher friction in the bearing. This can also lead to a damage of the surface of the bearing components by erosion and decomposition. This leads to mechanical problems in the bearing, like higher wear, thus the lifetime and the reliability of the bearing is reduced and the cost of service and maintenance are increased.

To avoid electric currents in the bearing the bearing is often electrically isolated from the rest of the machinery. This avoids that a current can flow through the bearing.

But electric charges can still build up between the machinery and the isolated part of the bearing. When the electric potential reaches a certain level the potential will discharge. This leads to short but strong current flowing through the bearing. This will lead to the same mechanical problems as described above.

WO2011069686 describes a lightning protection system for a wind turbine having an electrically grounded structure part, a main shaft and blades connected to the blade hub, comprises a down-conductor attachable inside a blade, a high voltage conductor for guiding lightning current, wherein a first end of the high voltage conductor is in electrical communication with the down-conductor. It further comprises a high voltage contact attachable inside the main shaft, wherein a second end of the high voltage conductor is in electrical communication with the high voltage contact and wherein a lightning current is guided from the down-conductor via the high voltage conductor to the high voltage contact.

This construction can reduce the risk of lightning strike currents leading through the bearing. If there is a failure in the connections of the high voltage conductor, the current of the lightning strike will lead through the bearing. Even if there is no failure, there is a certain possibility that the lightning will not choose the high voltage connection.

WO2011084723 describes an assembly, system and method for discharging a rotation shaft encompassed by a stationary housing. The system includes an annular charge-dissipating component and a biasing element oriented to apply an axial force to the charge-dissipating component, holding it in contact with the shaft and the housing while the shaft is rotating.

EP121546 describes an overvoltage protector in an apparatus having two moving parts. The parts are in mutual communication via a bearing, one part being stationary in relation to a substructure at an electrical earth potential. The moving part can be subjected to a voltage and the stationary part is electrically connected to the earthed substructure. For preventing a current passing through the bearing between the parts, an electrical insulator is provided in the current path which can occur through the bearing as a result of the different potentials of the parts. The moving part has a projection at a distance from a means connected to electrical earth such that a spark discharge gap is formed between mutually moving parts. The bearings are protected against current by the electrical insulator up to a given voltage threshold. In order that this voltage threshold will not be exceeded, the spark discharge gap comes into operation at a lower value that this voltage threshold and keeps the voltage difference between the parts at this lower value.

JP2005151749 describes a conducting member that conductively contacts a pair of an outer ring and a bearing housing and a pair of an inner ring, and is switchable in contacting and non-contacting. There is provided a switch drive means that switches the conducting member into a contact state and a noncontact state. There is also provided a switch control means that gives a switching command to the switch drive means.

All these solutions show the disadvantage of unreliability. The solutions mentioned above might get damaged by a first lightning strike and might lead to a current flowing through the bearing thereafter.

SUMMARY

An aspect relates to providing an improved bearing arrangement.

A bearing arrangement for a wind turbine comprises a first bearing shell that is prepared to be coupled to a first part of the wind turbine. The bearing arrangement comprises a second bearing shell that is prepared to be coupled to a second part of the wind turbine. The first and the second bearing shell are arranged in a way that the first and the second bearing shell are rotatable with respect to each other, so that the first part of the wind turbine can be rotated with respect to the second part of the wind turbine.

A first isolation ring is arranged between the first bearing shell and the first part of the wind turbine, so that the first bearing shell and the first part of the wind turbine are electrically isolated from each other in a certain predetermined voltage range.

An impedance electrical connection is arranged between, and is connected to, the first bearing shell and the first part of the wind turbine to prohibit formation of an electrical potential between the first bearing shell and the first part of the wind turbine.

The first part of a wind turbine can be a shaft of the wind turbine, a stator of the generator, or a part of the stationary construction of the wind turbine for example.

The second part of the wind turbine can be a rotor of the generator, a hub or a part of the rotating part of the wind turbine for example.

The first and the second bearing shell are normally made of a material like a metal. Thus the bearing shells can carry an electrical charge. This electrical charge can be a static charge accumulated due to the rotation of the wind turbine, "tribology rubbing", common mode currents and voltage from an inverter, capacitive induced coupling from the generator at high or low frequency.

The electric charge can also occur due to weather condition like lightning.

The first bearing shell is attached to the first part of the wind turbine. An isolating ring is present between the first bearing shell and the first part of the wind turbine, to isolate the first bearing shell from the first part of the wind turbine.

A bearing can be seen as a ring-shaped structure, whereby the two bearing shells are ring shaped. To isolate the first bearing shell electrically from the first part of the wind turbine the isolation material needs to follow along the inner or outer perimeter of the bearing. Thus the isolation material is also ring shaped. This means that the isolation material is arranged in a ring along the first bearing shell, regardless of whether the material is formed as one complete ring. Thus the isolation material can also be segmented and the segments build an isolation ring when they are arranged at the first bearing shell.

The first bearing shell is thus electrically isolated from the first part of the wind turbine. Thus the flow of current is prevented that has the potential to damage the lubrication in the bearing and the bearing itself. This can be creep currents present in the wind turbine.

The isolation ring isolates the first bearing shell from the first part of a wind turbine electrically up to a certain voltage level. The isolation ring is needed to prohibit lightning to flow over the bearing, as this would damage the lubrication and the bearing.

When the wind turbine is in operation, the rolling elements float on a film of lubricant. An electric potential can build up in the isolated first bearing shell. This can lead to a current or a discharge over the lubricant and the rolling elements to the second bearing shell. The current of the discharge can damage the lubrication and thus the bearing and needs to be avoided.

The break down voltage of the lubricant relates to the thickness and condition of the lubricant inside the bearing between the rolling elements and the first or the second bearing shell.

The first part of the wind turbine is electrically connected to the second part of the wind turbine and/or the second bearing shell. The electrical connection can be established by arranging a carbon brush at the first part of the wind turbine. The carbon brush can slide along a conductive part of the second part of the wind turbine.

The first part of the wind turbine and the second part of the wind turbine are connected to a reference ground of the wind turbine.

An impedance electrical connection can be provided by a resistor, a varistor, or a combination of a capacitor in parallel to a resistor or a combination of a coil in row with a resistor or a semiconductor for example.

The impedance is attached with its first end to the first bearing shell and with its second end to the first part of the wind turbine. Thus the impedance is provided a possibility for an electric current to flow from the first bearing shell to the first part of the wind turbine.

Thus an electrical potential, due to static charge for example, will be continuously discharged through the impedance. Thus a discharge of an electric potential over the lubrication and the rolling elements from the first bearing shell to the second bearing shell is avoided. Thus a discharge flowing through the lubrication is avoided. Thus, damage of the lubrication is avoided. Thus a damage of the bearing is avoided.

In addition a possible creeping current running through the bearing is limited. Thus damage to the bearing due to static charge, creep current and charge left after a high current discharges are avoided. Thus the lifetime of the bearing is increased. Thus the cost of service and exchange of parts is reduced. Thus the cost of the energy produced is reduced.

In an exemplary embodiment a second isolation ring is arranged between the second bearing shell and the second part of the wind turbine, so that the second bearing shell and the second part of the wind turbine are electrically isolated from each other in a certain predetermined voltage range.

Also the second bearing shell can be electrically isolated from the second part of the wind turbine. The second bearing shell is attached to the second part of the wind turbine. Between the second bearing shell and the second part of the wind turbine a second isolation ring is arranged.

The second isolation ring can be equivalently described as the first isolation ring and shows equivalent properties as described for the first isolation ring above.

Thus the second bearing shell is electrically isolated from the second part of the wind turbine. Thus the electrical potential of the second bearing shell is independent from the electrical charge of the second part of the wind turbine. In addition a creeping current is blocked from flowing from the second part of the wind turbine to the second bearing shell.

Thus the risk of an electrical potential between the first bearing shell and the second bearing shell that might exceed the break-down voltage of the lubrication layers is reduced. Thus the risk of static discharges in the lubrication layer of the bearing is reduced. Thus lubrication is improved and damage to the bearing shells are reduced.

Thus the lifetime of the bearing is increased. Thus the costs of service and exchange of parts is reduced. Thus the cost of the energy produced is reduced.

In addition a possible creeping current running through the bearing and charge building up due to creep currents are avoided. Thus the damages in the bearing due to creep current and a charge left over from high current discharges are avoided. Thus the lifetime of the bearing is increased. Thus the costs of service and exchange of parts is reduced. Thus the cost of the energy produced is reduced.

In an exemplary embodiment an impedance electrical connection is arranged between, and is connected to, the second bearing shell and the second part of the wind turbine to prohibit formation of an electrical potential between the second bearing shell and the second part of the wind turbine.

An impedance electrical connection can be attached with a first end to the second bearing shell and with a second end to the second part of the wind turbine. Thus the build up of an electrical potential between the second bearing shell and the second part of the wind turbine is avoided. Thus a sudden discharge of the electrical potential is avoided. Thus damage to the bearing because of this discharge is avoided. Thus the lifetime of the bearing is increased.

In an exemplary embodiment at least one of the impedances described above is protected against moisture, humidity and dirt.

The impedance is protected against environmental factors like moisture, dirt and humidity. Thus the electrical properties of the impedance are not influenced by these factors. Thus the electrical properties of the impedance are reliable and constant. Thus the reliability of the function and the lifetime of the impedance is enhanced.

In an exemplary embodiment the impedance is attached by leads to the first or the second bearing shell and/or to the first of the second part of the wind turbine.

The impedance can be connected with its first end to the first bearing shell and with its second end to the first part of the wind turbine. Or, the impedance can be connected with its first end to the second bearing shell and with its second end to the second part of the wind turbine.

The impedance can be connected by leads. Thus the leads of the impedance can be used to connect the impedance to the first bearing shell, the second bearing shell, the first part of the wind turbine or the second part of the wind turbine. Thus the impedance can be soldered to the other parts. Thus, the connection is cheap and can easily be established. Thus no additional constructional elements are needed to establish the connection.

In an exemplary embodiment the impedance is attached to the first or the second bearing shell and/or to the first of the second part of the wind turbine by a welded or screwed connection.

The impedance can be connected with its first end to the first bearing shell and with its second end to the first part of the wind turbine. Or, the impedance can be connected with its first end to the second bearing shell and with its second end to the second part of the wind turbine.

In this embodiment the impedance is connected by a welded or a screwed connection. Thus a welded or screwed connection is more solid. Thus the connection is not as vulnerable as a soldered connection. Thus the connection will survive more rigorous working conditions or rougher environmental conditions, like corrosion or the influence of lightning accidentally passing through the connection. Thus repair or maintenance is not as often necessary. Thus the costs of service are reduced.

In an exemplary embodiment the impedance is arranged in the upper half of the bearing arrangement.

Especially in a main bearing of a wind turbine the inner opening of the ring shaped bearing is a main walkway for personnel during service. When the impedance is arranged in the upper half of the bearing arrangement it is out of the walking area of service personnel. Thus, service personnel will not step on the impedance. Thus damage to the impedance due to mechanical forces is reduced. Thus the life-time of the impedance is increased. Thus the cost of service and of exchange parts are reduced.

In an exemplary embodiment the first part of the wind turbine represents the electrical reference ground of the wind turbine.

The reference ground of the wind turbine is the shaft, the bed frame, the support structure, the housing, the hub or the tower for example.

Thus, the electrical potential in the first bearing ring is leveled out to the reference ground of the wind turbine.

In an exemplary embodiment the impedance electrical connection is a resistor.

In this embodiment the impedance is a resistor with a highly active resistance.

Thus the resistor shows no, or nearly no, reactive impedance. Thus the resistance is constant regardless of the frequency of the voltage applied. Thus when applied in parallel to the isolation ring, which can be regarded as a capacitor, no oscillation of a current flowing through the resistor is initiated.

In an exemplary embodiment the resistor shows a resistance above 50 kilo-Ohm, in a range between 50 kilo Ohm and 1 Mega Ohm.

With a resistance above 50 k Ohm the resistor is capable of reducing creep currents efficiently. Thus creep currents are reduced. Thus damage to the lubrication and to the bearing due to creep currents is reduced. Thus the life-time of the bearing is enhanced.

The resistance of the resistor is below 1 M Ohm. The resistance should not be over 1 M Ohm to allow a current through the resistor to level out different electrical potential in the bearing shells and the parts. Thus the building up of the bearing shell with an electrical potential is effectively avoided. And a present electrical potential can be reduced.

In an exemplary embodiment the resistor is a high voltage type resistor.

A resistor build for a high voltage use is built in a longer shape with a larger distance between the leads.

Thus a discharge along or through the resistor is avoided when a high electrical potential in the bearing shell is present.

Thus the resistor is longer in its overall length and can therefore be better mounted to the respective bearing shell and the part of the wind turbine.

In an exemplary embodiment a measuring bridge is connected to the impedance to measure the operational value of the impedance attached to the bearing and/or the value of the impedance of the isolation ring.

A measuring bridge is an arrangement where a known resistance is added to a circuit to be measured. The voltage drop at the known resistance is measured. The value of the impedance of the circuit can then be calculated. When a measuring bridge is added to the impedance at the bearing shell and the part of the wind turbine the value of the impedance attached and the value of the capacity of the isolation ring can be calculated.

The operational value of the impedance attached is the value of the impedance in operation in the wind turbine.

The lubrication is bridged by the rolling elements when the wind turbine is not rotating. The rotation of the wind turbine can be detected and the performance of the measurement can be coupled to the rotation of the wind turbine.

Thus the operational value of the impedance and the isolation ring can be detected. Thus changes in the values can be detected, which might occur due to the influence of first, humidity, failures and lightning strikes. Thus the correct mode of operation of the impedance and the isolation ring can be detected. Thus failures in the isolation ring or in the impedance can be detected.

In an exemplary embodiment a control unit is attached to the measuring bridge to control the measurement.

Thus the measurement is controllable. Thus also the results of the measurement can be evaluated. Thus the measurement can be done completely independent from any presence of service personnel in the wind turbine. Thus the measurement can be performed during the normal operation of the wind turbine. Thus the value of the impedance and the value of the capacity of the isolation ring can be monitored continuously. Thus the values and their development can be recorded and analyzed by the controller.

In an exemplary embodiment the control unit is configured in a way to be capable of providing a warning signal when the value of the measurement is outside of a certain predetermined area.

When the value of the impedance of the value of the capacity of the isolation ring, measured with the measuring bridge, is changing and is too high or too low, a warning signal is created by the controller. The warning signal can be fed into the controller of the wind turbine or can be transferred to a remote service capacity.

Thus a warning signal is generated when the values are out of a certain predetermined range. Thus a warning is created, when the proper function of the impedance is not assured.

Thus the warning signal can be transferred to a control. Thus the warning signal can be used to influence the control of the wind turbine. Thus in the case of a failure the control of the wind turbine can act according to a predetermined scheme.

Thus the warning signal can be transferred to a remote service facility. Thus the service personnel know in advance about an improper function of the impedance or the isolation ring. Thus the service crew can prepare in advance before entering the wind turbine. Thus service is optimized.

In an exemplary embodiment the control unit is configured in a way to be capable of measuring the value periodically and discontinuous.

Thus the measurement is performed regularly after a certain time interval. Thus the measurement can be performed every 5 minutes for example of once per hour. Thus energy used for the measurement is minimized.

The measurement is done as a non-continuous measurement, so with interruptions in between. Thus the voltage for the measurement is switched on and off. Thus a voltage step can be used for the measurement by applying a voltage to the circuit and switching the voltage of again.

The measured response of the voltage over the measurement resistor, the answer, can then be detected. The answer to the voltage step gives information about the active resistance and the reactive impedance in the circuit. Thus the impedance and the capacity of the isolation ring can be measured for example. Thus the measurement is more accurate.

Also a voltage peak can be used for the measurement.

BRIEF DESCRIPTION

Some of the embodiments will be described in detail, with reference to the following figures, wherein like designations denote like members, wherein:

FIG. 1 depicts a perspective view of an embodiment of a radial cut through the bearing arrangement;

FIG. 2 depicts a perspective view of a second embodiment of the bearing arrangement;

DETAILED DESCRIPTION

Figure 3:
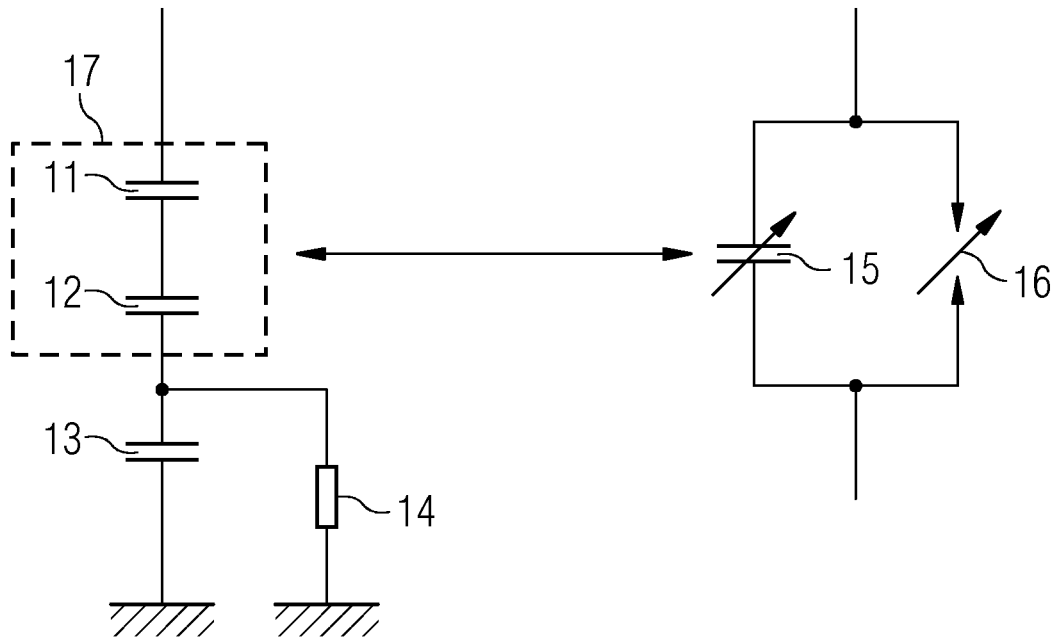
FIG. 3 depicts a perspective view of an embodiment of the electrical equivalent diagram of the arrangement.

FIG. 1 shows a radial cut through one side of the ring-shaped bearing arrangement 1.

The bearing arrangement 1 comprises a first bearing shell 2 and a second bearing shell 3. The bearing shells 2 and 3 are arranged in a way that they are movable in respect to each other to allow a rotation of the bearing.

The second bearing shell 3 holds for example a rotor of a direct drive generator with permanent magnets and a hub with rotor blades. The second bearing shell 3 is electrically connected to a first part of the wind turbine 4 and connected to electric reference ground.

In this case the first bearing shell 2 is connected to a first part of the wind turbine 4. Between the first bearing shell 2 and the first part of the wind turbine 4 is an isolation ring 5. The first bearing shell 2 and the first part of the wind turbine 4 can be mechanically connected through electrically isolated bolts. The isolation ring 5 isolates the first bearing shell 2 electrically from the first part of the wind turbine 4.

In one embodiment the isolation ring 5 is located in a groove in the material of the first part of the wind turbine 4. The first bearing shell 2 is located in a groove in the isolation ring 5. The groove in the material of the first part of the wind turbine 4 is a ring-shaped groove leading along an outer surface of the first part of the wind turbine 4. The bearing is also ring-shaped and rests in the isolation material of the isolation ring 5.

In the embodiment shown the bearing is a rolling element bearing, this can be a tapered roller bearing for example. The rolling element 6 is present between the first bearing shell 2 and the second bearing shell 3. To reduce friction in the bearing, the bearing comprises a layer of lubrication 7 between the rolling element 6 in the first bearing shell 2 and another layer of lubrication 7 between the rolling element 6 and the second bearing shell 3.

Due to the electrical isolation of the isolation layer 5 the bearing arrangement 1 is capable to build up a certain electrical charge between the bearing and the first part of the wind turbine 4. When the wind turbine is in operation the rolling elements 6 are floating on a lubrication oil layer, thus being isolated from the first bearing shell.

To avoid an electrical charge and a difference in the electrical potential between the first bearing shell 2 and the first part of a wind turbine 4 an impedance 8 is attached with one end to the first bearing shell 2 and to the first part of a wind turbine 4 with its second end.

In this embodiment the impedance 8 is a resistor. The impedance can also be a coil or a semiconductor in other embodiments.

FIG. 2 shows a second embodiment of the bearing arrangement 1.

FIG. 2 shows a radial cut through one side of another embodiment of the bearing arrangement 1.

The bearing arrangement 1 comprises a first bearing shell 2 and a second bearing shell 3. The bearing shells 2 and 3 are arranged in a way that they are movable in respect to each other to allow a rotation of the bearing.

In this case the first bearing shell 2 is connected to a first part of the wind turbine 4 and the second bearing shell 3 is connected to a second part of the wind turbine 9. Between the first bearing shell 2 and the first part of the wind turbine 4 is an isolation ring 5a. The isolation ring 5a isolates the first bearing shell 2 electrically from the first part of the wind turbine 4.

Between the second bearing shell 3 and the second part of the wind turbine 9 is also an isolation ring 5b. The isolation ring 5b isolates the second bearing shell 3 electrically from the second part of the wind turbine 9.

In another embodiment an impedance device can be connected with one end to the second bearing shell 3 and with the second end to the second part of the wind turbine 9. This allows a current to flow between the second bearing shell 3 and the second part of the wind turbine 9, so that an electric charge in one of the parts can be leveled out.

FIG. 3 shows the electrical equivalent diagram of the arrangement.

FIG. 3 shows an electrical diagram that represents the bearing arrangement shown in FIG. 1.

The bearing with its two layers of lubrication present between the bearing shells and the rolling element is represented by the capacitors 11 and 12. The capacitors 11 and 12 are connected in a row, i.e. in series, when the wind turbine is rotating and the rolling elements are floating on the lubricant. The dotted line 17 represents the bearing with the two bearing shells, the two isolation layers and the rolling element.

The isolation ring is also represented as a capacity 13. In parallel to the capacitor 13 is the impedance 14 that represents the impedance 8 shown in FIG. 1.

The impedance 14 discharges any electrical potential present in the capacity 13. The capacitor 13 and the impedance 14 are connected to the reference ground of the wind turbine, which equals the first part of the wind turbine in FIG. 1.

The bearing 17, represented by the two capacitors 11 and 12 can also be seen as a variable capacitor 15 in parallel to a variable spark-gap 16. The capacity of the variable capacitor 15 depends on the thickness and electrical properties of the lubrication in the bearing. The variable spark-gap 16 represents the possibility of an electrical discharge in the bearing that causes a current to flow through the lubrication layers.

The bearing 17 can be connected to electric reference ground on the side of the second bearing shell.

Figure 4:
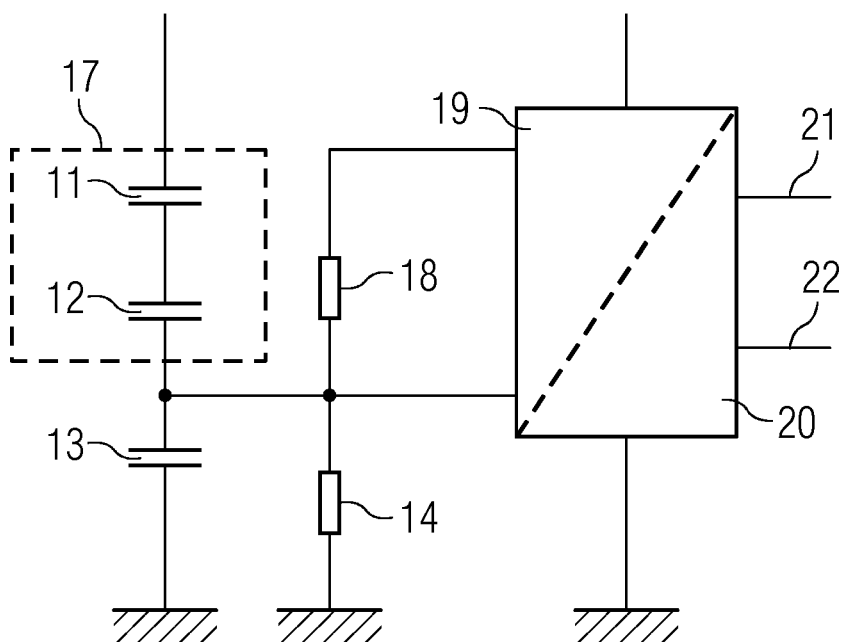
FIG. 4 depicts a perspective view of an embodiment of the electrical diagram of the arrangement with the measuring bridge and the controller.

FIG. 4 shows the electrical diagram of the bearing arrangement 1 with the measuring bridge 19 and the controller 20.

FIG. 4 shows the bearing 17 represented as two capacitors 11 and 12 connected in a row. The capacitor 13 represents the capacity of the isolation ring. The impedance 14 is the impedance attached to the first bearing shell and the first part of the wind turbine.

A measuring bridge 19 is connected to a resistor 18 and to the reference ground in the wind turbine. With the measuring bridge 19 the voltage drop at the resistor 18 can be measured in respect to the reference ground. The resistor 18 is connected with its first end to a first input of the measuring bridge 19. The resistor is connected with its second end to the connection between the impedance 14 and the capacitor 12 and 13. In addition this second side of the resistor 18 is also connected to the measuring bridge 19.

With this arrangement the voltage drop at the combination of the capacitor 13 and the impedance 14 can be measured. With a known impedance 14 it is possible to calculate the capacity of the capacitor 13.

A defect in the isolation ring 5 can be identified.

A low value of the capacity 13 or a bridging thereof provides a low impedance conduction path which potentially allows for a discharge from lightning conducted through the bearing.

In addition a controller 20 is connected to the measurement bridge 19. The controller 20 allows to control the measurement of the measurement bridge 19 and to control the results of the measurements.

In an exemplary embodiment the controller 20 controls the measurement bridge 19 in a way that the measurement is done discontinuous. So the value of the resistor and the capacitor are measured periodically with a certain predetermined time between the measurements. The measurement can be carried out every minute for example.

The controller implies an impulse or a step of a voltage to the resistors 18, the impedance 14 and the capacity 13. The development of the voltage at the resistor 18 is measured and the values of the impedance 14 and the capacitor 13 can be calculated.

The controller 20 compares the result that was achieved to a stored range of results that represent allowed results. If the measured result is above or below the range of allowed results the controller provides a warning signal at an output 21 of the controller. This warning signal can be used in the controller of the wind turbine to activate an alarm.

Other output signals from the controller 20 over an output 22 are possible. This can be an error signal for example.

The invention claimed is:

1. A bearing arrangement for a wind turbine, comprising
    a first bearing shell, that is prepared to be coupled to a first part of the wind turbine,
    a second bearing shell, that is prepared to be coupled to a second part of the wind turbine,
    whereby the first bearing shell and the second bearing shell are arranged in a way that the first bearing shell and the second bearing shell are rotatable with respect to each other, so that the first part of the wind turbine rotates with respect to the second part of the wind turbine,
    a first isolation ring, that is arranged between the first bearing shell and the first part of the wind turbine, so that the first bearing shell and the first part of the wind turbine are electrically isolated from each other in a certain predetermined voltage range, and
    wherein an impedance electrical connection is arranged between, and is connected to, the first bearing shell and the first part of the wind turbine to prohibit formation of an electrical potential between the first bearing shell and the first part of the wind turbine.

2. The bearing arrangement according to claim 1, wherein a second isolation ring is arranged between the second bearing shell and the second part of the wind turbine, so that the second bearing shell and the second part of the wind turbine are electrically isolated from each other within a certain predetermined voltage range.

3. The bearing arrangement according to claim 2, wherein an impedance electrical connection is arranged between, and is connected to, the second bearing shell and the second part of the wind turbine to prohibit formation of an electrical potential between the second bearing shell and the second part of the wind turbine.

4. The bearing arrangement according to claim 1, wherein at least one impedance is protected against moisture, humidity and dirt.

5. The bearing arrangement according to claim 1, wherein the impedance is attached by leads to the first or the second bearing shell; or to the first or the second part of the wind turbine.

6. The bearing arrangement according to claim 1, wherein the impedance is attached to the first or the second bearing shell; or to the first or the second part of the wind turbine by a welded or screwed connection.

7. The bearing arrangement according to claim 1, wherein the impedance is arranged in the upper half of the bearing arrangement.

8. The bearing arrangement according to claim 1, wherein the first part of the wind turbine represents the electrical reference ground of the wind turbine.

9. The bearing arrangement according to claim 1, wherein the impedance electrical connection is a resistor.

10. The bearing arrangement according to claim 9, wherein the resistor has a resistance above 50 kilo-Ohm.

11. The bearing arrangement according to claim 9, wherein the resistor is a high voltage type resistor.

12. The bearing arrangement according to claim 1, wherein a measuring bridge is connected to the impedance to measure the operational value of the impedance attached to the bearing or the value of the impedance of the isolation ring.

13. The bearing arrangement according to claim 12, wherein a control unit is attached to the measuring bridge to control the measurement.

14. The bearing arrangement according to claim 13, wherein the control unit is configured in a way to be capable of providing a warning signal when the value of the measurement is above or below a certain predetermined range.

15. The bearing arrangement according to claim 14, wherein the control unit is configured in a way to be capable of measuring the value in a periodical and discontinuous manner.

16. The bearing arrangement according to claim 10, wherein the resistor has a resistance above 50 kilo-Ohm in a range between 50 kilo Ohm and 1 Mega Ohm.

* * * * *